US008508329B2

United States Patent
Veenstra

(10) Patent No.: US 8,508,329 B2
(45) Date of Patent: Aug. 13, 2013

(54) MOBILE ROBOTIC DEVICE HAVING A COLLISION SENSOR

(75) Inventor: Auke-Jan Veenstra, Roden (NL)

(73) Assignee: Koninklijke Philips N.V., Eindhoven (NL)

( * ) Notice: Subject to any disclaimer, the term of this patent is extended or adjusted under 35 U.S.C. 154(b) by 300 days.

(21) Appl. No.: 13/058,250

(22) PCT Filed: Aug. 10, 2009

(86) PCT No.: PCT/IB2009/053511
§ 371 (c)(1),
(2), (4) Date: Feb. 9, 2011

(87) PCT Pub. No.: WO2010/018530
PCT Pub. Date: Feb. 18, 2010

(65) Prior Publication Data
US 2011/0140829 A1    Jun. 16, 2011

(30) Foreign Application Priority Data
Aug. 12, 2008  (EP) .................................. 08162224

(51) Int. Cl.
| G06F 13/42 | (2006.01) |
| G08B 5/36 | (2006.01) |
| G08B 23/00 | (2006.01) |
| B60K 1/00 | (2006.01) |
| B60T 7/16 | (2006.01) |
| B60S 9/00 | (2006.01) |

(52) U.S. Cl.
USPC ...... 340/1.1; 340/815.51; 340/517; 180/65.1; 180/168; 180/169; 180/204

(58) Field of Classification Search
USPC .................... 340/1.1, 815.51; 180/65.1, 168, 180/169, 65.8, 908, 204
See application file for complete search history.

(56) References Cited

U.S. PATENT DOCUMENTS

| 4,458,234 | A | * | 7/1984 | Brisard ......................... 340/438 |
| 4,596,412 | A | * | 6/1986 | Everett et al. .................... 293/4 |
| 5,995,884 | A | | 11/1999 | Allen et al. |
| 6,481,515 | B1 | * | 11/2002 | Kirkpatrick et al. ......... 180/65.1 |
| 7,474,941 | B2 | * | 1/2009 | Kim et al. ..................... 700/258 |
| 8,378,613 | B2 | * | 2/2013 | Landry et al. ................. 318/580 |
| 2002/0116089 | A1 | * | 8/2002 | Kirkpatrick, Jr. ............. 700/245 |
| 2002/0174506 | A1 | | 11/2002 | Wallach et al. |
| 2005/0021181 | A1 | | 1/2005 | Kim et al. |
| 2011/0140829 | A1 | | 6/2011 | Veenstra |

FOREIGN PATENT DOCUMENTS

| CN | 201591525 U | 9/2010 |
| EP | 1582957 A2 | 10/2005 |
| WO | 02067745 A1 | 9/2002 |
| WO | 2008105634 A | 9/2008 |

OTHER PUBLICATIONS

M. Rude; "A Flexible, Shock-Absorbing Bumper System With Touch-Sensing Capability for Autonomous Vehicles", Proc. IROS 96, Inst of Engineering Sciences and Electronics (Tara Center), Tsukuba, Ibaraki, Japan, Nov. 4-8, 1996.

* cited by examiner

*Primary Examiner* — Daniel Wu
*Assistant Examiner* — Muhammad Adnan

(57) ABSTRACT

A mobile robotic device comprising at least one displaceable sensor member (8,9) for sensing a collision between the mobile device and a stationary object. First detection means (12,13) are present for detection a predetermined first displacement of the sensor member (8,9) and second detection means (14,15) are present for detecting a predetermined larger displacement of the sensor member (8,9).

5 Claims, 2 Drawing Sheets

MOBILE ROBOTIC DEVICE HAVING A COLLISION SENSOR

FIELD OF THE INVENTION

The invention is related to a mobile robotic device comprising at least one displaceable sensor member for sensing a collision between the mobile device and a stationary object, whereby the sensor member is disposed in a spring-loaded fashion so as to normally be in an extended position, and whereby means are present for detecting the displacement of the sensor member with respect to the mobile device, whereby said means comprise first detection means for detection of a predetermined first displacement of the sensor member and second detection means for detecting a predetermined larger displacement of the sensor member.

BACKGROUND OF THE INVENTION

Such mobile robotic device is disclosed in KR-B-100835968, which pre-published document corresponds to the later published publication WO-A-2008/105634. This publication describes a robotic vacuum cleaner having a displaceable sensor member comprising two bumpers at its front side in the main direction of travel. The first bumper is disposed on a higher portion of the front side of the device and the second bumper is disposed on the lower portion. Thereby, the first bumper senses objects to be avoided and the second bumper senses objects to be passed over. The second bumper can rotate downward around a horizontal axis, so that the device is lifted in order to pass over the surmountable object. The first bumper can be disposed to be protruded compared with the second bumper, so that an obstacle to be avoided first contacts with the first bumper and then with the second bumper. Therefore, before the second bumper is operated, the obstacle to be avoided is determined.

Another kind of tactile bumper of an autonomous mobile robot or platform is described in U.S. Pat. No. 4,596,412. The tactile bumper comprises a plurality of displaceable sensor members being free-floating strips encased in a housing. The means for detecting the displacement of the sensor members are a plurality of micro switches affixed to the housing and arranged behind the sensor members.

For example, the mobile robotic device is a vacuum cleaner for autonomously cleaning a room while the mobile device is travelling around on the floor of the room. Thereby, the path of the vacuum cleaner can be controlled based on observation of its environment by cameras or other observation means, such as sonar sensors or infrared sensors. Additionally, sensor members are present at one or more sides of the mobile device in order to detect physical contact between the mobile device and stationary objects (obstacles) on the floor of the room. The vacuum cleaner may comprise two modules, a main module comprising the vacuum fan and a debris collection compartment, and a cleaning head module connected with the main module by a hose, through which hose the debris is transported from the cleaning head module to the main module. Furthermore, the hose comprises conductive wires for supplying electric power from the main module to the cleaning head module and for exchanging electronic information between the two modules. Such vacuum cleaner is disclosed in US-A-2002/0174506. Thereby, the cleaning head module can be the mobile device comprising the one or more sensor members for sensing physical contact between the module and stationary objects on the floor of the room to be cleaned.

SUMMARY OF THE INVENTION

In general, the mobile robotic device has to find its path of traveling between stationary objects in its environment. When the mobile device contacts an stationary object, the direction of travelling has to be changed, so that the stationary object can be avoided. Therefore, contact with such stationary object is detected in order to continue the movement of the mobile device in a different direction, for example in the opposite direction, away from the stationary object. However, the mobile device can be trapped between stationary objects when travelling. In order to escape from such trapped position, the mobile device will make movements, such as displacements forwards and backwards and/or rotation around a vertical axis, but the space for maneuvering may be small.

An object of the invention is a mobile robotic device, whereby means are present for detecting the displacement of the sensor member with respect to the mobile device and whereby said means comprise first detection means for detection of a predetermined first displacement of the sensor member and second detection means for detecting a predetermined larger displacement of the sensor member, whereby a compact and relative simple structure can be achieved.

In order to accomplish with that object, the sensor member is attached to a frame, whereby the sensor member can be displaced with respect to the frame being said first displacement detected by said first detection means, and whereby the sensor member together with the frame can be displaced with respect to the mobile device for obtaining said larger displacement of the sensor member detected by said second detection means, which second detections means detect a predetermined displacement of the frame. Thereby, the spring load between the mobile device and the frame is higher than the spring load between the frame and the sensor member. By making use of such intermediary frame, a compact and relative simple structure can be achieved, in particular when the device is relative small, for example in case it is the cleaning head module of a vacuum cleaner.

During normal travelling of the mobile device, the control of the movement of the mobile device is based on the signals from the first detection means. However, in case the mobile device is in a position whereby it appears to be difficult to escape out of that position, for example when maneuvering repeatedly forwards and backwards, then said second detection means become active and overrule said first detection means, whereby the mobile device has more freedom to move in order to escape from the trapped position.

In a preferred embodiment, the sensor member is a displaceable bumper at a side of the mobile device, preferably the front side and/or the rear side of the mobile device. Thereby, the bumper can generate a detection signal as soon as the mobile device contacts a stationary object, as well as can absorb the impact during a collision between the mobile device and that object. The mobile device may carry two or more bumpers at different sides of the mobile device, whereby each bumper functions as a sensor member.

A mobile robotic device having a displaceable bumper defining the periphery of the device is disclosed in EP-A-1582957. The bumper floats on springs over the main frame of the device. Contact with an obstacle causes movement of the bumper with respect to the main frame, which movement is detected by means of a joystick switch.

Preferably, the mobile robotic device has a main direction of travel, whereby two sensor members are present at opposite sides of the mobile device, being a front sensor member and a rear sensor member, whereby said front sensor member reaches in the main direction of travel. When the mobile device is trapped between two stationary objects, one in front of the mobile device and one at its rear side, then the freedom of maneuvering can be enlarged by making use of the second detection means instead of the first detection means. Thereby, the mobile device can move forwards and backwards over a larger distance, so that it has more space to rotate around its vertical axis in order to escape out of its trapped position.

The frame may carry more than one sensor member, whereby the first detection means detect a predetermined displacement of each of the sensor members, and the second detection means detect a predetermined displacement of the frame. In a preferred embodiment, the frame carries two sensor members at opposite sides of the mobile device, preferably at the front side and at the rear side in the main direction of travel of the mobile device, so that the mobile device has an increased freedom in maneuvering forwards and backwards during escaping out of a trapped position. Of course, the frame may carry more than the two sensor members, for example at each side of the device.

Preferably, the detection means comprise micro switches, which micro switches can be activated by the displacement of the sensor member. Micro switches are simple and relative small devices that can provide for a electric signal when the sensor member makes a predetermined displacement.

In a preferred embodiment, the mobile device is a vacuum cleaner comprising a main module and a mobile cleaning head module connected by a hose to the main module, for example as is described in US-A-2002/0174506, whereby the cleaning head module comprises said displaceable sensor member.

The invention is also related to a method of controlling a mobile robotic device comprising at least one displaceable sensor member sensing collisions between the mobile device and stationary objects, whereby the sensor member is disposed in a spring-loaded fashion so as to normally be in an extended position, and whereby the displacement of the sensor member with respect to the mobile device is detected, whereby first detection means detect a predetermined first displacement of the sensor member and whereby second detection means detect a predetermined larger displacement of the sensor member, whereby the sensor member is attached to a frame, whereby the sensor member is displaced with respect to the frame being said first displacement detected by said first detection means, and whereby the sensor member together with the frame is displaced with respect to the mobile device for obtaining said larger displacement of the sensor member detected by said second detection means.

BRIEF DESCRIPTION OF THE DRAWING

The invention will now be further elucidated by means of a description of an embodiment of the cleaning head module of a mobile robotic vacuum cleaner, comprising two displaceable sensor members attached to a displaceable frame. Reference is made to the drawing comprising diagrammatical figures, whereby.

Figure 2:
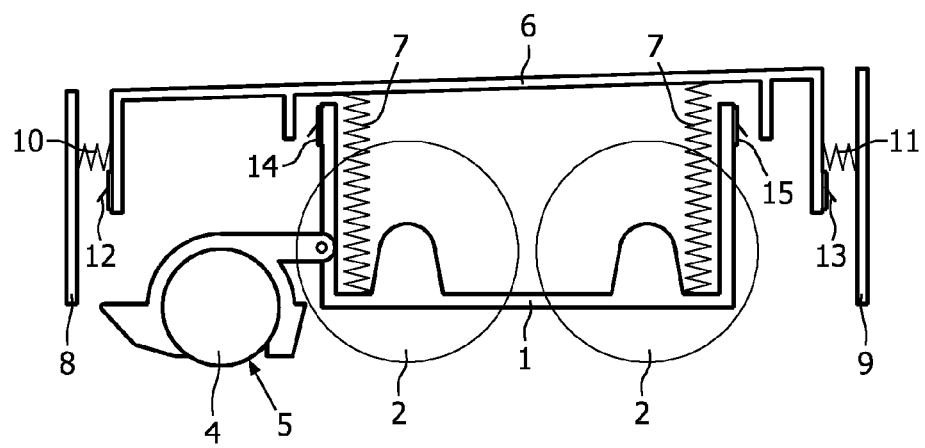
FIG. 2 and FIG. 3 are schematic sectional views of the module.
Figure 3:
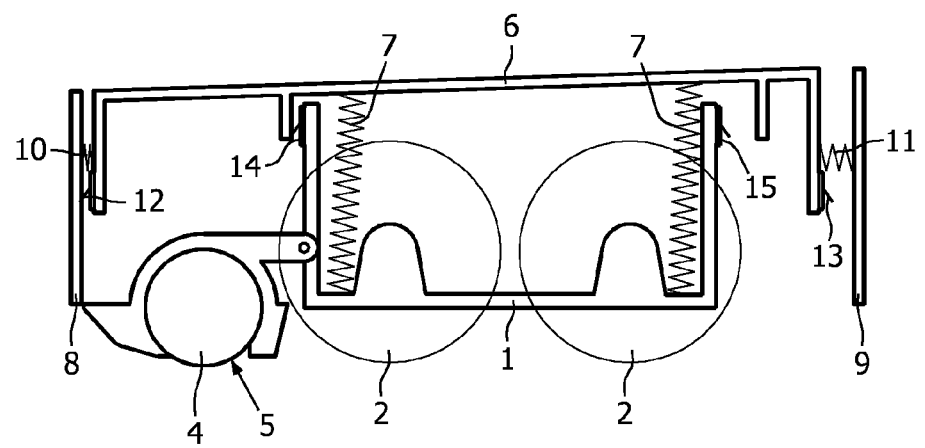

In particular the FIGS. 2 and 3 are schematic representations, only showing parts that contribute to the elucidation of the described embodiment.

DETAILED DESCRIPTION OF AN EMBODIMENT

Figure 1:
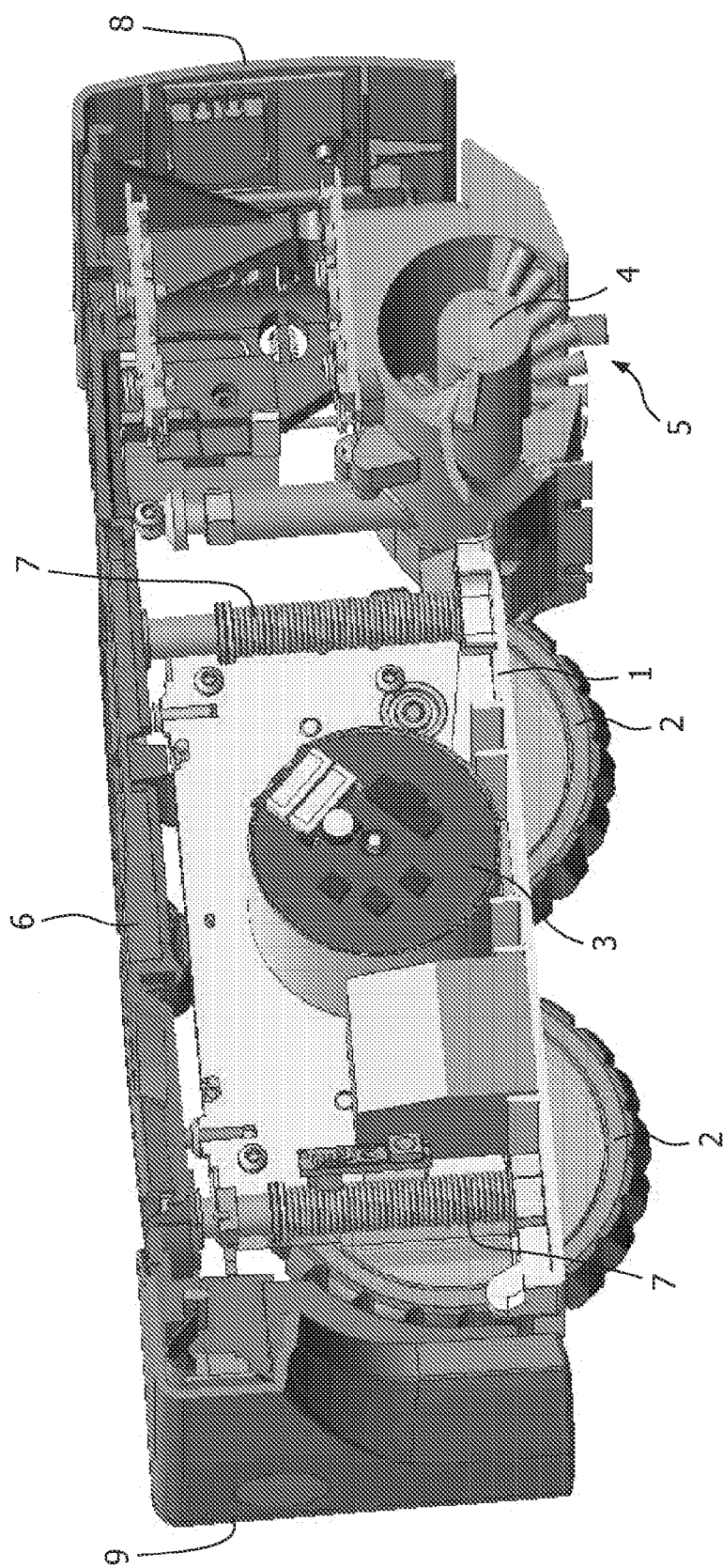
FIG. 1 is a perspective view of a cross section of the cleaning head module.

The figures show the cleaning head module having a base part 1 forming the major portion of the lower side of the module. The base part 1 carries four wheels, whereby only two wheels 2 are represented in the sectional views. The two wheels 2 are driven by an electric motor 3 (FIG. 1) and the two other wheels (not shown) are driven by another electric motor (not shown). By separately controlling the rotational speed of the two pair of wheels 2, the movement of the module on a floor can be controlled. Thereby, the module can be displaced forwards and backwards, and can be rotated around a vertical axis by driving the pairs of wheels 2 with different rotational speeds, during its displacement as well as during a stationary position of the module.

The cleaning head module has a rotating brush 4 in a suction mouth 5 extending in transverse direction with respect to the main direction of travel of the module, in the figures to the right direction and to the left direction. During operation, the opening of the suction mouth 5 at the lower side of the module is located close to the floor, while the rotating brush 4 is touching the floor, so that debris will be removed from the floor and will be sucked through the suction mouth 5 and transported to a hose (not shown) connected to the cleaning head module. The other end of the hose is connected with the main module of the vacuum cleaner (not shown) comprising a vacuum fan and a debris collection compartment.

The upper wall of the module is a part of a frame 6, which frame 6 partly surrounds the module. The frame 6 is attached to the base part 1 by means of four helical springs 7 (two springs 7 are shown), so that the frame 6 can move in horizontal direction. The springs 7 are relative rigid, so that a relative large force is required to displace the frame 6 with respect to the base part 1. At the front side of the module (in FIG. 1 the right side and in FIGS. 2 and 3 the left side) the frame 6 carries a bumper 8, while the frame carries a bumper 9 at the rear side of the module. The two bumpers 8,9 are attached to the frame 6 by means of helical springs 10,11 (represented in FIGS. 2 and 3), so that each bumper 8,9 can be displaced from its extended position (shown in FIG. 2) towards the frame 6 against the pushing force of the springs 10,11. Thereby, each bumper 8,9 will contact a micro switch 12,13, which micro switch 12,13 detects the displacement of the bumper 8,9.

When the cleaning head module is travelling forwards (in FIGS. 2 and 3 to the left), the module may bump against a stationary object, whereby the bumper 8 at the front side of the module is pushed towards the frame 6 (as is shown in FIG. 3). Thereby, the micro switch 12 is activated whereby a signal is generated reporting the collision with the stationary object, so that the movement of the cleaning head module will be stopped immediately and will be continued in the opposite direction away from the stationary object. It may be that the module is then bumping against an other stationary object, for example when the module was not traveling in a straight path or when the other stationary object was not present before. Thereby, the bumper 9 at the rear side of the module is pushed towards the frame 6, so that micro switch 13 detects the collision with said other stationary object. In order to find a way out of such trapped position, the module can try to rotate around a vertical axis while moving forwards and backwards. When the space between the two stationary objects is relative small, it may be difficult for the module to maneuver. In order to increase the freedom of maneuvering, the detection by the micro switches 12,13 is inactivated and the detection of the contact with the stationary objects is taken over by the micro switches 14,15, which micro switches 14,15 are activated when the frame 6 moves with respect to the base part 1 of the module. Because the detection by the micro switches 14,15 takes place at a larger displacement of the bumpers 8,9 with respect to the base part 1, the module can move closer to the two stationary objects resulting in an increased freedom of maneuvering of the module.

FIG. 3 shows the situation whereby the micro switches 12,13 are inactivated, i.e. are out of order, and whereby the collision with stationary objects is detected by means of the micro switches 14,15. In FIG. 3 the module is bumped against a stationary object when moving in forward direction. Thereby, the micro switch 14 is activated because the frame 6 is moved against the force of springs 7. The force for moving frame 6 with respect to the base part 1 is larger than the force generated by the springs 10,11, so that the frame 6 only moves with respect to the base part 1 when one of the springs 10,11 is pushed inwardly.

In summary, a mobile robotic device comprising at least one displaceable sensor member 8,9 for sensing a collision between the mobile device and a stationary object. First detection means 12,13 are present for detection a predetermined first displacement of the sensor member 8,9 and second detection means 14,15 are present for detecting a predetermined larger displacement of the sensor member 8,9.

The described embodiment of the invention is only an example, many other embodiments are possible within the scope of the invention.

The invention claimed is:

1. A mobile robotic device comprising at least one displaceable sensor member (8,9) for sensing a collision between the mobile device and a stationary object, whereby the sensor member (8,9) is disposed in a spring-loaded fashion so as to normally be in an extended position, and whereby means (12,13,14,15) are present for detecting the displacement of the sensor member (8,9) with respect to the mobile device, whereby said means comprise first detection means (12,13) for detection of a predetermined first displacement of the sensor member (8,9) and second detection means (14,15) for detecting a predetermined larger displacement of the sensor member (8,9), characterized in that the sensor member (8,9) is attached to a frame (6), whereby the sensor member (8,9) is displaced with respect to the frame (6) being said first displacement detected by said first detection means (12,13), and whereby the sensor member (8,9) together with the frame (6) can be displaced with respect to the mobile device for obtaining said larger displacement of the sensor member (8,9) detected by said first detection means (12, 13) and said second detection means (14,15), characterized in that said detection means comprise micro switches (12, 13, 14, 15) which are activated by the displacement of the sensor member (8, 9).

2. A device as claimed in claim 1, characterized in that the mobile robotic device has a main direction of travel, and in that two sensor members (8,9) are present at opposite sides of the mobile device, being a front sensor member (8) and a rear sensor member (9), whereby said front sensor member (8) reaches in the main direction of travel.

3. A device as claimed in claim 1, characterized in that the frame (6) carries two sensor members (8,9) at opposite sides of the mobile device.

4. A device as claimed in claim 1, whereby the mobile device is a vacuum cleaner comprising a main module and a mobile cleaning head module connected by a hose to the main module, characterized in that the cleaning head module comprises said displaceable sensor member (8,9).

5. A method of controlling a mobile robotic device comprising at least one displaceable sensor member (8,9) sensing collisions between the mobile device and stationary objects, whereby the sensor member (8,9) is disposed in a spring-loaded fashion so as to normally be in an extended position, and whereby the displacement of the sensor member (8,9) with respect to the mobile device is detected, whereby first detection means (12,13) detect a predetermined first displacement of the sensor member (8,9) and whereby second detection means (14,15) detect a predetermined larger displacement of the sensor member (8,9), characterized in that the sensor member (8,9) is attached to a frame (6), whereby the sensor member (8,9) is displaced with respect to the frame (6) being said first displacement detected by said first detection means (12,13), and whereby the sensor member (8,9) together with the frame (6) is displaced with respect to the mobile device for obtaining said larger displacement of the sensor member (8,9) detected by said first detection means (12, 13) and said second detection means (14,15), characterized in that said detection means comprise micro switches (12, 13, 14, 15) which are activated by the displacement of the sensor member (8, 9).

* * * * *